(12) United States Patent
Natarajan et al.

(10) Patent No.: US 11,870,767 B1
(45) Date of Patent: Jan. 9, 2024

(54) METHODS FOR PROVIDING ADAPTIVE AUTHENTICATION FOR FEDERATED ENVIRONMENT AND DEVICES THEREOF

(71) Applicant: F5 Networks, Inc., Seattle, WA (US)

(72) Inventors: Ravi Natarajan, Fremont, CA (US); Siarhei Miadzvezhanka, Mountain View, CA (US)

(73) Assignee: F5, Inc., Seattle, WA (US)

( * ) Notice: Subject to any disclaimer, the term of this patent is extended or adjusted under 35 U.S.C. 154(b) by 410 days.

(21) Appl. No.: 16/368,497

(22) Filed: Mar. 28, 2019

Related U.S. Application Data (60) Provisional application No. 62/649,083, filed on Mar. 28, 2018.

(51) Int. Cl.
*H04L 9/40* (2022.01)
*H04L 47/70* (2022.01)

(52) U.S. Cl.
CPC .......... *H04L 63/0815* (2013.01); *H04L 47/70* (2013.01); *H04L 63/102* (2013.01)

(58) Field of Classification Search
CPC .... H04L 63/0815; H04L 63/102; H04L 47/70
See application file for complete search history.

(56) References Cited

U.S. PATENT DOCUMENTS

| | | | |
|---|---|---|---|
| 9,191,381 B1* | 11/2015 | Popp | ................... H04L 63/0823 |
| 9,432,864 B2 | 8/2016 | Jorgensen et al. | |
| 2008/0271121 A1* | 10/2008 | Hinton | ................ H04L 63/0815 726/4 |
| 2010/0242092 A1* | 9/2010 | Harris | ..................... H04L 63/08 726/3 |
| 2012/0158993 A1 | 6/2012 | McNamee et al. | |
| 2021/0336955 A1* | 10/2021 | Huffman | ............... H04L 63/083 |

OTHER PUBLICATIONS

BIG-IP® Access Policy Manager® : Implementations, Version 13.1, F5 Networks, Inc., Nov. 15, 2017.
F5 Networks, Inc, "BIG-IP® Local Traffic Manager: Implementations", Manual, May 24, 2014, pp. 1-296, v 11.6, F5 Networks, Inc.
F5 Networks, Inc, "BIG-IP® Policy Enforcement Manager: Implementations", Manual, Aug. 20, 2014, pp. 1-154, v 11.6, F5 Networks, Inc.
F5 Networks, Inc, "Managing the Migration to IPv6 Throughout the Service Provider Network", Jun. 11, 2012, pp. 1-10.

(Continued)

*Primary Examiner* — Joe Chacko
(74) *Attorney, Agent, or Firm* — Troutman Pepper Hamilton Sanders LLP (FS PATENTS)

(57) ABSTRACT

Methods, non-transitory computer readable media, network traffic manager apparatuses, and systems that assist with providing adaptive authentication for federated environment includes receiving a request to access an application from a client. Next, one of a plurality of web application servers in which the requested application is executing is identified and data associated with the requesting client is obtained. An authentication request comprising an index based on the identified web application server and the obtained client data is generated. The requesting client using the generated authentication request including the index is authenticated.

16 Claims, 4 Drawing Sheets

(56) References Cited

OTHER PUBLICATIONS

F5 Networks, Inc., "Big-IP® CGNAT: Implementations", Manual, Jul. 13, 2016, pp. 1-112, v 11.6, F5 Networks, Inc.
F5 Networks, Inc., "BIG-IP® Local Traffic Management: Basics", Mar. 17, 2016, Manual, pp. 1-74, v 11.6, F5 Networks, Inc.
F5 Networks, Inc., "F5 Local Traffic Manager and Global Traffic Manager Operations Guide", Manual, Jul. 2016, pp. 1-136, F5 Networks, Inc.

* cited by examiner

METHODS FOR PROVIDING ADAPTIVE AUTHENTICATION FOR FEDERATED ENVIRONMENT AND DEVICES THEREOF

This application claims the benefit of U.S. Provisional Patent Application Ser. No. 62/649083, filed Mar. 28, 2018, which is hereby incorporated by reference in its entirety.

FIELD

This technology generally relates to methods and devices for network traffic management and, more particularly, to methods for providing adaptive authentication for federated environment and devices thereof.

BACKGROUND

In federated environments, when a user accesses a protected application hosted by a service provider, the user is authenticated by an identity provider and redirected back to the client application with a set of requested user information as an assertion. The client application validates the assertion and uses the content of the assertion to perform authorization checks, like access to protected resources based on the retrieved user information. A single identity provider handles authentication requests from different users accessing different information in the generated assertion. Often a single access policy is configured at the identity provider and is used for handling authentication requests from all the users and service providers. This causes sub-optimal end user experience and also unnecessary resource utilization on the identity provider side.

SUMMARY

A method for providing adaptive authentication for federated environment includes receiving a request to access an application from a client. Next, one of a plurality of web application servers in which the requested application is executing is identified and data associated with the requesting client is obtained. An authentication request comprising an index based on the identified web application server and the obtained client data is generated. The requesting client using the generated authentication request including the index is authenticated.

A non-transitory computer readable medium having stored thereon instructions for providing adaptive authentication for federated environment comprising machine executable code which when executed by at least one processor, causes the processor to receive a request to access an application from a client. Next, one of a plurality of web application servers in which the requested application is executing is identified and data associated with the requesting client is obtained. An authentication request comprising an index based on the identified web application server and the obtained client data is generated. The requesting client using the generated authentication request including the index is authenticated.

A network traffic management apparatus including at least one of configurable hardware logic configured to be capable of implementing or a processor coupled to a memory and configured to execute programmed instructions stored in the memory to receive a request to access an application from a client. Next, one of a plurality of web application servers in which the requested application is executing is identified and data associated with the requesting client is obtained. An authentication request comprising an index based on the identified web application server and the obtained client data is generated. The requesting client using the generated authentication request including the index is authenticated.

A network traffic management system, comprising one or more traffic management apparatuses, client devices, or server devices, the network traffic management system comprising memory comprising programmed instructions stored thereon and one or more processors configured to be capable of executing the stored programmed instructions to receive a request to access an application from a client. Next, one of a plurality of web application servers in which the requested application is executing is identified and data associated with the requesting client is obtained. An authentication request comprising an index based on the identified web application server and the obtained client data is generated. The requesting client using the generated authentication request including the index is authenticated.

This technology provides a number of advantages including providing a method, non-transitory computer readable medium, apparatus, and system that assist with providing adaptive authentication for federated environment. By using the techniques illustrated below, the technology is able to allow selective enforcement of certain access control checks based on the authentication requests.

DETAILED DESCRIPTION

Figure 1:
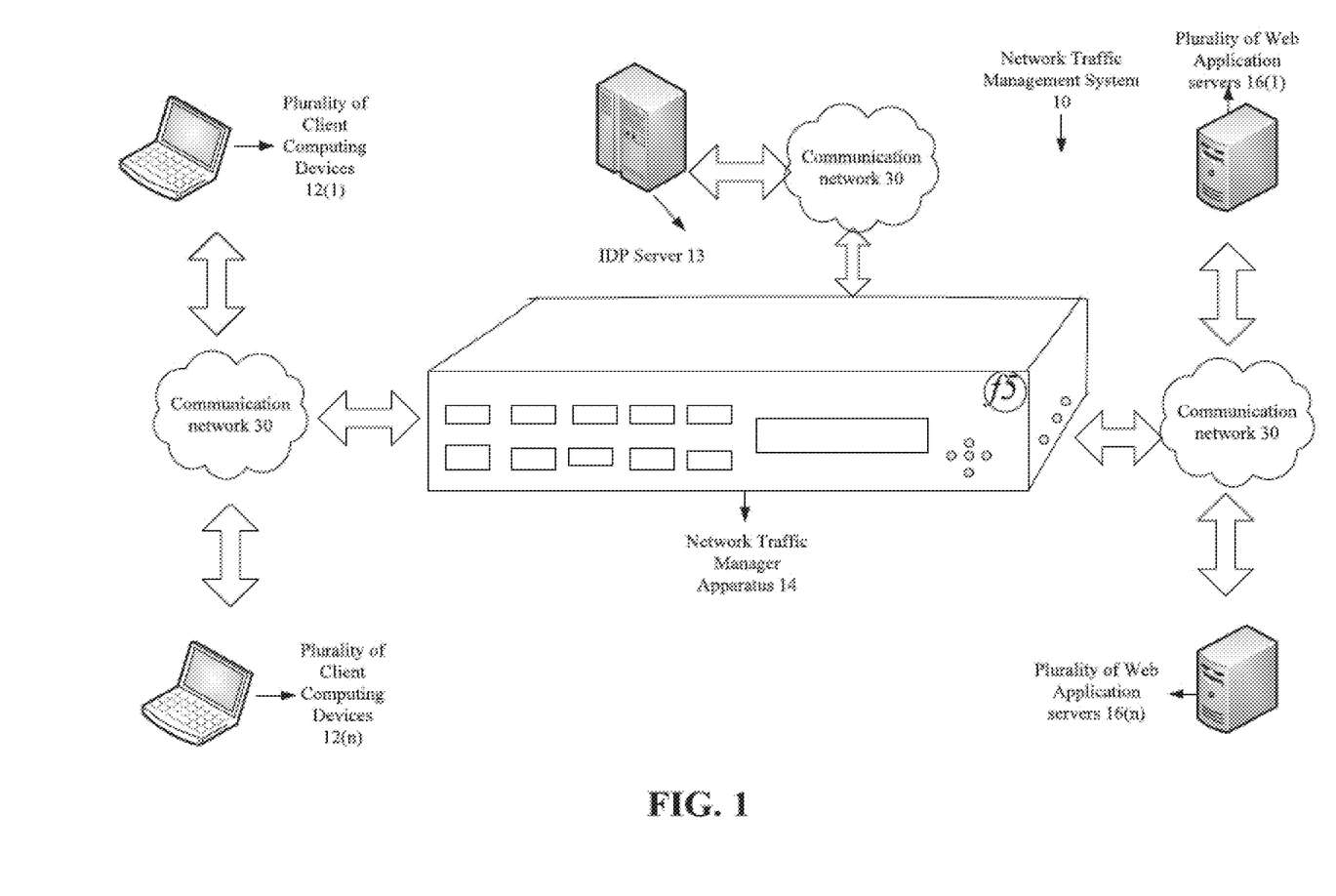
FIG. 1 is an example of a block diagram of a network traffic management system including a network traffic management apparatus for providing adaptive authentication for federated environment.
Figure 2:
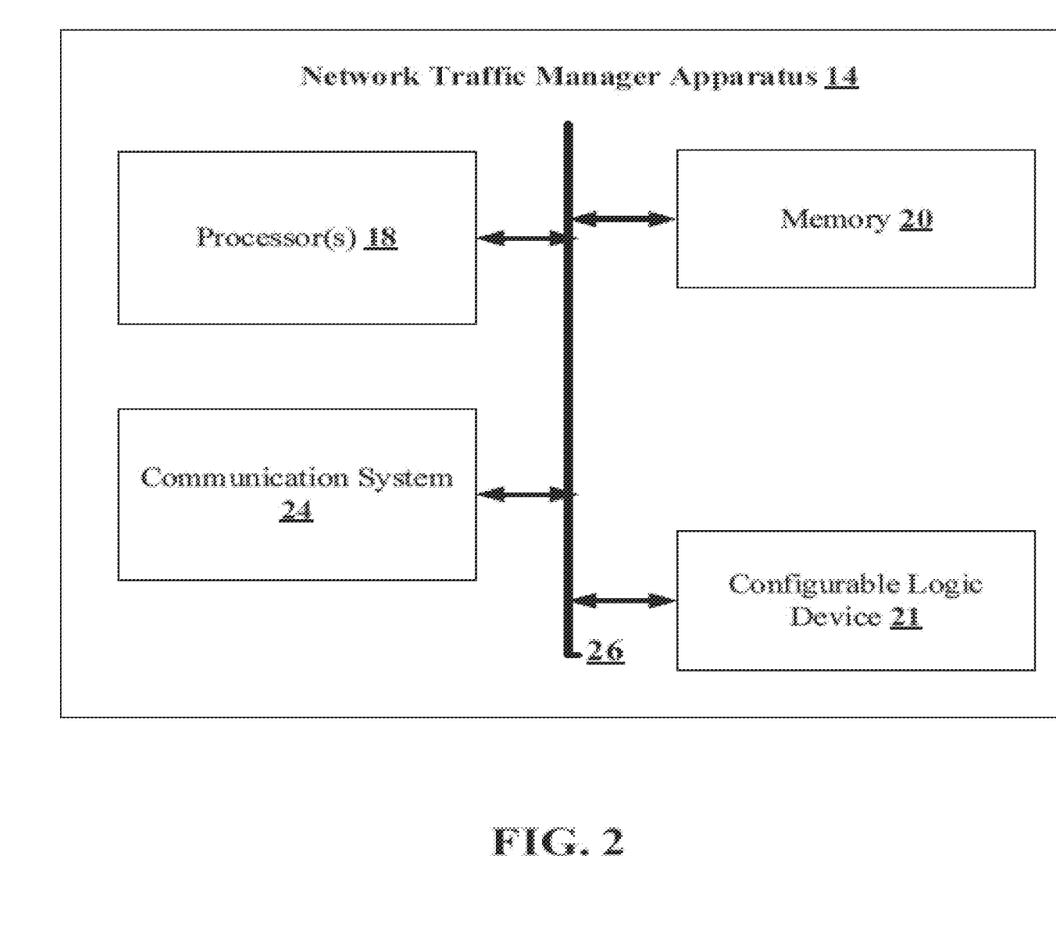
FIG. 2 is an example of a block diagram of a network traffic management apparatus.

An example of a network environment 10 which incorporates a network traffic management system for providing adaptive authentication for federated environment with the network traffic manager apparatus 14 is illustrated in FIGS. 1 and 2. The exemplary environment 10 includes a plurality of client computing devices 12(1)-12(n), an identity provider (IDP) server 13, a network traffic manager apparatus 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing adaptive authentication for federated environment.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of web application servers 16(1)-16(n) through the communication network 30, although the web application servers 16(1)-16(n) and the network traffic manager apparatus 14 may be coupled together via other topologies. Further, the network traffic manager apparatus 14 is coupled to the IDP server 13 through the communication network 30, although the IDP server 13 and network traffic manager apparatus 14 may be coupled together via other topologies.

The network traffic manager apparatus 14 assists with providing adaptive authentication for federated environment as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
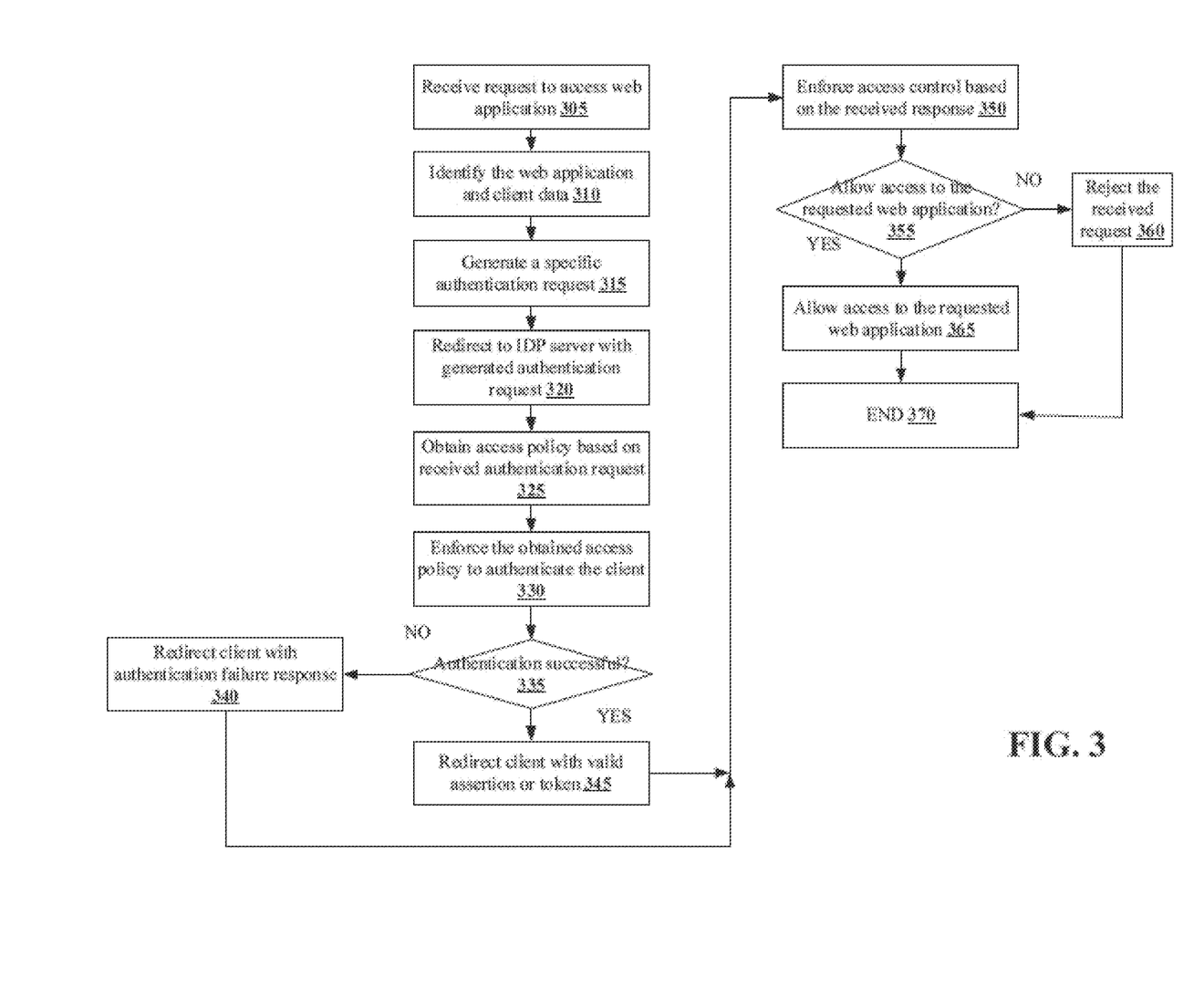
FIG. 3 is an exemplary flowchart of a method for providing adaptive authentication for federated environment.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
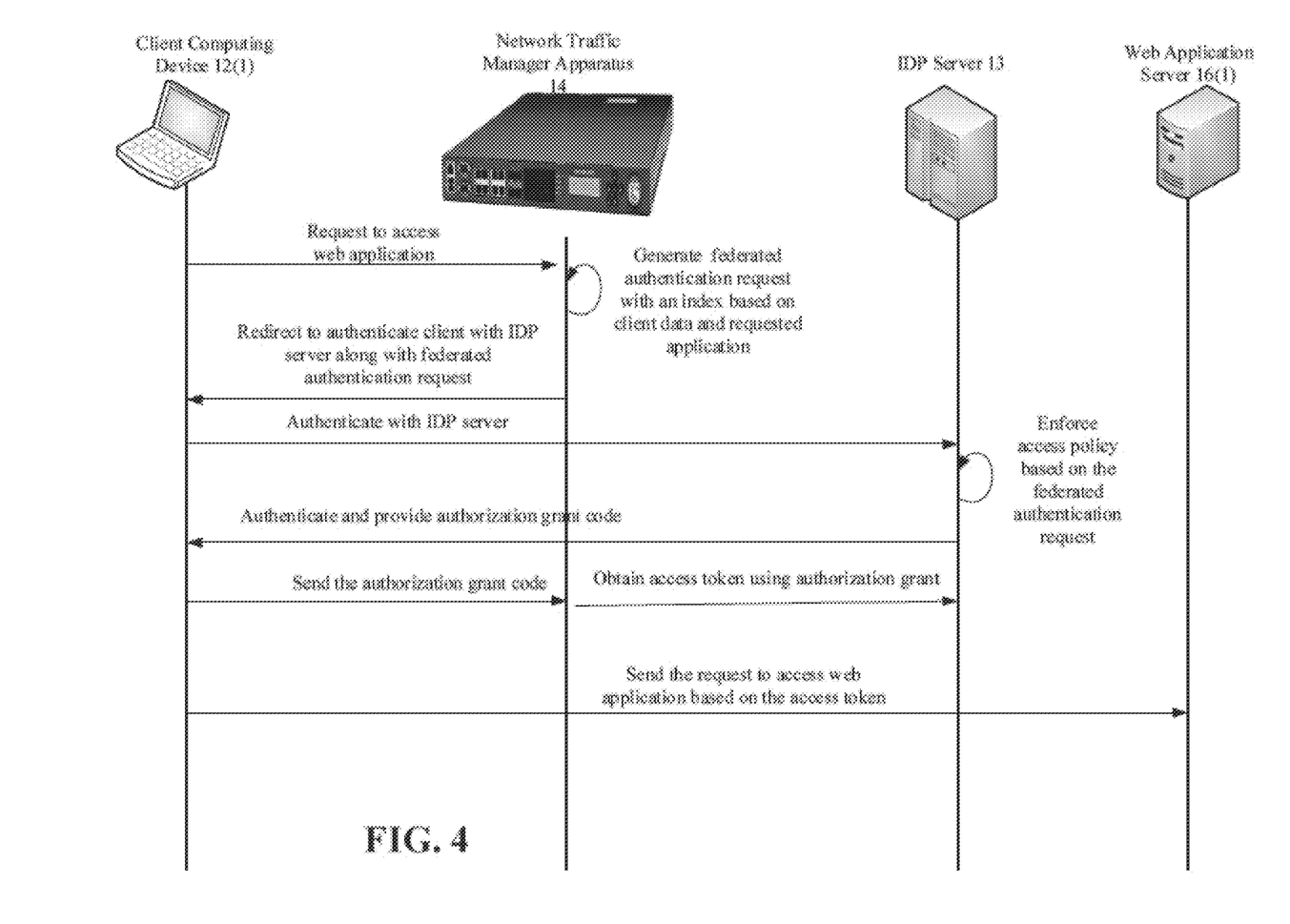
FIG. 4 is an exemplary sequence diagram for providing adaptive authentication for federated environment.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with 20 reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager 25 apparatus 14 is used to operatively couple and communicate between the network traffic manager apparatus 14, the plurality of client computing devices 12(1)-12(n), the IDP server 13, and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the 10 network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make 15 requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The IDP server 13 of the network traffic management system include a central processing unit (CPU) or processor, a memory, and a communication system, which are coupled together by a bus or other link, although other numbers and/or types of network devices could be used. Generally, the IDP server 13 assists with generating and providing access tokens, via the communication network 30 according to the HTTP-based application RFC protocol or the CIFS or NFS protocol in this example, but the principles discussed herein are not limited to this example and can include other application protocols. A series of applications may run on the IDP server 13 that allows the transmission of data requested by the network traffic manager apparatus 14. It is to be understood that the IDP server 13 may be hardware or software or may represent a system with multiple external resource servers, which may include internal or external networks. In this example the IDP server 13 may be any version of Microsoft® IIS servers or Apache® servers, although other types of servers may be used.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of client computing devices 12(1)-12(n), network traffic manager apparatus 14, via the communication network 30 according to the HTTP-based application RFC 20 protocol or the CIFS or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of web application servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although the plurality of web application servers 16(1)-16(n) are illustrated as single servers, one or more actions of the IDP server 13 and each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within network traffic manager apparatus 14 rather than as a stand-alone server communicating with network traffic manager apparatus 14 via the communication network(s) 30. In this example the plurality of web application servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the IDP server 13, plurality of web application servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the IDP server 13, the network traffic manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the IDP server 13, the plurality of web application servers 16(1)-16(n), for example, may be configured to operate as virtual instances on the same physical machine. In other words, one or more of network traffic manager apparatus 14, the IDP server 13, the plurality of client computing devices 12(1)-12(n), or the plurality of web application servers 16(1)-16(n) illustrated in FIG. 1 may operate on the same physical device rather than as separate devices communicating through a network as depicted in FIG. 1. There may be more or fewer plurality of client computing devices 12(1)-12(n), the IDP server 13, network traffic manager apparatus 14, or the plurality of web application servers 16(1)-16(n) than depicted in FIG. 1. The plurality of client computing devices 12(1)-12(n), the IDP server 13, the plurality of web application servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Networks (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for providing adaptive authentication for federated environment will now be described with reference to FIGS. 1-4. First in step 305, the network traffic manager apparatus 14 receives a request from one of the plurality of client computing devices 12(1)-12(n) to access a web application executing in the plurality of web applications servers 16(1)-16(n), although the network traffic manager apparatus 14 can receive other types of requests from other devices.

Next in step 310, the network traffic manager apparatus 14 identifies one of the plurality of web application servers 16(1)-16(n) on which the requested web application is executing based on the received request, although the network traffic manager apparatus 14 can use other techniques to identify the web application server. Additionally, the network traffic manager apparatus 14 obtains data associated with the requesting one of the plurality of client computing devices 12(1)-12(n) and in this example, the obtained data includes type of the requesting client device, operating system executing on the requesting client device, the geographical location of the requesting client device, current state of the client device, although other types or amounts of data associated with the client device can be obtained.

In step 315, the network traffic manager apparatus 14 generates a federated authentication request based on the obtained client data, requested web application, and the identified one of the plurality of web application servers 16(1)-16(n), although the network traffic manager apparatus 14 can generate the federated authentication request based on other parameters in other formats. In this example, the generated federated authentication request includes data associated with a specific index, although the generated federated authentication request can include other types or amounts of information. Additionally, by way of example, the federated authentication request can be a SAML, OAuth, or any other standard federated authentication request.

In step 320, the network traffic manager apparatus 14 redirects the requesting one of the plurality of client computing devices 12(1)-12(n) to the IDP server 13 along with the generated federated authentication request, although the network traffic manager apparatus 14 can redirect the requesting one of the plurality of client computing devices 12(1)-12(n) along with other types or amounts of data.

Next in step 325, the IDP server 13 obtains the access policy associated with the index data that is present in the received federated authentication request, although the IDP server 13 can obtain the access policy based on other types or amounts of parameters. In this example, the IDP server 13 includes a pre-configured mapping of the indexes to the corresponding access policies within the memory of the IDP server 13, although the IDP server 13 can use other techniques to obtain the access policy (or policies) based on the index.

In step 330, the IDP server 13 enforces the obtained access policy on the requesting one of the plurality of client computing devices 12(1)-12(n) to authenticate the requesting client device, although the IDP server 13 can use other techniques to authenticate the client device.

Next in step 335, the IDP server 13 determines if the authentication is successful. In this example, the IDP server 13 determines that the authentication is successful when the requesting one of the plurality of client computing devices 12(1)-12(n) when the obtained access policy is successfully enforced on the requesting one of the plurality of client computing devices 12(1)12-(n). By way of example, successful authentication includes validating user credentials, validating the state and security configurations of the requesting client device, although successful authentication can include determining: the geographical location of the requesting client device, operating system, and/or version of the client device. In this example, the IDP server 13 generates an assertion or token when the authentication is successful and generates a failure response when the authentication is not successful. Accordingly, when the IDP server 13 determines that the requesting one of the plurality of client computing devices 12(1)-12(n) is not successfully authenticated, then the No branch is taken to step 340.

In step 340, the IDP server 13 redirects the requesting one of the plurality of client computing devices 12(1)-12(n) back to the network traffic manager apparatus 14 with the failure response.

However, back in step 335, when the IDP server 13 determines that the requesting one of the plurality of client computing devices 12(1)-12(n) is successfully authenticated, then the Yes branch is taken to step 345. In this example, the IDP server 13 redirects the requesting one of the plurality of client computing devices 12(1)-12(n) back to the network traffic manager apparatus 14 with the assertion or token, although the IDP server 13 can redirect the requesting one of the plurality of client computing devices 12(1)-12(n) with any other data.

In step 350, the network traffic manager apparatus 14 enforces the access control based on the received response. In this example, the access control enforcement includes validating the received assertion or token or the failure response, either locally or by communicating with the IDP server 13 and verifying the content of the received assertion or token.

In step 355, the network traffic manager apparatus 14 determines whether to provide the requesting one of the plurality of client computing devices 12(1)-12(n) access to the requested application based on the enforced access control. Accordingly, in this example, when the network traffic manager apparatus 14 determines that the requesting one of the plurality of client computing devices 12(1)-12(n)

should not be provided access to the requested application, then the No branch is taken to step 360. In step 360, the network traffic manager apparatus 14 rejects the received request and the exemplary flow proceeds to end in step 370.

However, back in step 355, when the network traffic manager apparatus 14 determines that the requesting one of the plurality of client computing devices 12(1)-12(n) should be provided the access to the requested application, then the Yes branch is taken to step 365. In step 365, the network traffic manager apparatus 14 provides the requesting one of the plurality of client computing devices 12(1)-12(n) access to the application and the exemplary process ends at step 370.

Accordingly, as illustrated and described by way of the examples herein, this technology provides a number of advantages including providing methods, non-transitory computer readable media and devices for providing adaptive authentication for federated environment. Using the above illustrated examples, the disclosed technology is able to provide the client devices with a faster response to the request to access the application. Additionally, the disclosed technology is able to optimize authentication by enforcing the access policy that is specific to the requested application and/or the web application server on which the requested application is executing.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for providing adaptive authentication for federated environment, the method implemented by a network traffic management system comprising one or more network traffic apparatuses, client devices, or server devices, the method comprising:
   receiving a request to access an application from a client;
   identifying a web application server in which the requested application is executing and obtaining data associated with the requesting client;
   generating a federated authentication request comprising an index unique to the identified web application server, the requested application, and the obtained client data, wherein the index is mapped to an access policy within a memory of the web application server;
   authenticating the requesting client on a separate IDP server using the generated federated authentication request by using a federated token that maps to the identified web application server, the requested application, and the obtained client data and by using the mapping between the index and the access policy; and
   validating the authentication prior to providing the client access to the application, wherein the validating the authentication further comprises sending a communication to the identified web application server to verify an assertion or the federated token of the generated federated authentication request.

2. The method as set forth in claim 1 further comprising redirecting the client with the generated federated authentication request for authentication.

3. The method as set forth in claim 1 further comprising:
   obtaining the access policy based on the index in the received federated authentication request; and
   enforcing the obtained access policy on the requesting client.

4. The method as set forth in claim 3 further comprising:
   redirecting the client upon enforcing the obtained access policy, wherein the redirecting includes an assertion or a failure response;
   enforcing an access control policy based on the received assertion or the received failure response;
   determining when to provide the client access to the requested application based on the enforced access control policy.

5. A non-transitory computer readable medium having stored thereon instructions for providing adaptive authentication for federated environment comprising executable code which when executed by one or more processors, causes the processors to:
   receive a request to access an application from a client;
   identify a web application server in which the requested application is executing and obtaining data associated with the requesting client;
   generate a federated authentication request comprising an index unique to the identified web application server and the obtained client data, wherein the index is mapped to an access policy within a memory of the web application server;
   authenticate the requesting client on a separate IDP server using the generated authentication request by using a federated token that maps to the identified web application server, the requested application, and the obtained client data and by using the mapping between the index and the access policy; and
   validate the authentication prior to providing the client access to the application, wherein the validating the authentication further comprises sending a communication to the identified web application server to verify an assertion or the federated token of the generated authentication request.

6. The medium as set forth in claim 5 further comprises redirect the client with the generated authentication request for authentication.

7. The medium as set forth in claim 5 further comprising:
   obtain the access policy based on the index in the received authentication request; and
   enforce the obtained access policy on the requesting client.

8. The medium as set forth in claim 7 further comprising:
   redirect the client upon enforcing the obtained access policy, wherein the redirecting includes an assertion or a failure response;
   enforce an access control policy based on the received assertion or the received failure response;
   determine when to provide the client access to the requested application based on the enforced access control policy.

9. A network traffic manager apparatus, comprising memory comprising programmed instructions stored in the memory and one or more processors configured to be capable of executing the programmed instructions stored in the memory to:
   receive a request to access an application from a client;

identify a web application server in which the requested application is executing and obtaining data associated with the requesting client;

generate a federated authentication request comprising an index unique to the identified web application server and the obtained client data, wherein the index is mapped to an access policy within a memory of the web application server;

authenticate the requesting client on a separate IDP server using the generated authentication request by using a federated token that maps to the identified web application server, the requested application, and the obtained client data and by using the mapping between the index and the access policy; and validate the authentication prior to providing the client access to the application, wherein the validating the authentication further comprises sending a communication to the identified web application server to verify an assertion or the federated token of the generated authentication request.

10. The device as set forth in claim 9 wherein the one or more processors are further configured to be capable of executing the programmed instructions stored in the memory to redirect the client with the generated authentication request for authentication.

11. The device as set forth in claim 9 wherein the one or more processors are further configured to be capable of executing the programmed instructions stored in the memory to:

obtain the access policy based on the index in the received authentication request; and enforce the obtained access policy on the requesting client.

12. The device as set forth in claim 11 wherein the one or more processors are further configured to be capable of executing the programmed instructions stored in the memory to:

redirect the client upon enforcing the obtained access policy, wherein the redirecting includes an assertion or a failure response;

enforce an access control policy based on the received assertion or the received failure response;

determine when to provide the client access to the requested application based on the enforced access control policy.

13. A network traffic management system, comprising one or more traffic management apparatuses, client devices, or server devices, the network traffic management system comprising memory comprising programmed instructions stored thereon and one or more processors configured to be capable of executing the stored programmed instructions to:

receive a request to access an application from a client;

identify a web application server in which the requested application is executing and obtaining data associated with the requesting client;

generate a federated authentication request comprising an index unique to the identified web application server and the obtained client data, wherein the index is mapped to an access policy within a memory of the web application server;

authenticate the requesting client on a separate IDP server using the generated authentication request by using a federated token that maps to the identified web application server, the requested application, and the obtained client data and by using the mapping between the index and the access policy; and validate the authentication prior to providing the client access to the application, wherein the validating the authentication further comprises sending a communication to the identified web application server to verify an assertion or the federated token of the generated authentication request.

14. The network traffic management system of claim 13, wherein the one or more processors are further configured to be capable of executing the programmed instructions stored in the memory to redirect the client with the generated authentication request for authentication.

15. The network traffic management system of claim 13, wherein the one or more processors are further configured to be capable of executing the programmed instructions stored in the memory to: obtain the access policy based on the index in the received authentication request; and enforce the obtained access policy on the requesting client.

16. The network traffic management system of claim 13, wherein the one or more processors are further configured to be capable of executing the programmed instructions stored in the memory to: redirect the client upon enforcing the obtained access policy, wherein the redirecting includes an assertion or a failure response; enforce an access control policy based on the received assertion or the received failure response; determine when to provide the client access to the requested application based on the enforced access control policy.

* * * * *